United States Patent [19]

Masuda

[11] Patent Number: 4,858,434
[45] Date of Patent: Aug. 22, 1989

[54] WAVE-ACTIVATED POWER GENERATOR

[75] Inventor: Takahiko Masuda, Yokosuka, Japan

[73] Assignee: Kohichi Nishikawa, Japan

[21] Appl. No.: 619,632

[22] PCT Filed: Oct. 15, 1983

[86] PCT No.: PCT/JP83/00359
   § 371 Date: Jun. 14, 1984
   § 102(e) Date: Jun. 14, 1984

[87] PCT Pub. No.: WO84/01603
   PCT Pub. Date: Apr. 26, 1984

[30] Foreign Application Priority Data

Oct. 15, 1982 [JP] Japan ............................ 57-179990

[51] Int. Cl.$^4$ ............................................. F03B 13/12
[52] U.S. Cl. ................................................... 60/398
[58] Field of Search .................. 417/100, 330, 331; 60/398, 497, 499, 502; 290/42; 405/76

[56] References Cited

U.S. PATENT DOCUMENTS 4,231,711  11/1980  MacGregor .................. 417/100
4,441,316   4/1984  Moody ...................... 417/100 X

FOREIGN PATENT DOCUMENTS 252197  9/1926  United Kingdom ................ 405/76

*Primary Examiner*—Edward K. Look
*Attorney, Agent, or Firm*—Skjerven, Morrill, MacPherson, Franklin & Friel

[57] ABSTRACT

The present wave-activated power generator includes a main body floatable in the water surface and an air chamber is formed in the main body. An operating passage is formed as extending from the air chamber with its open end submerged under the water; on the other hand, there is provided a guide passage communicating the air chamber to the atmosphere via a power generating means, whereby, due to the motion of the water column inside the operating passage, there is formed an air flow from the air chamber to the atmosphere through the guide passage thereby driving the power generating means. The operating passage of the present wave-activated power generator is bent approximately in the shape of "L" with its open end provided as oriented toward the downstream direction with respect to the advancing direction of waves, so that it is structured to promote the motion of the water column inside the operating passage due to wave motion.

4 Claims, 4 Drawing Sheets

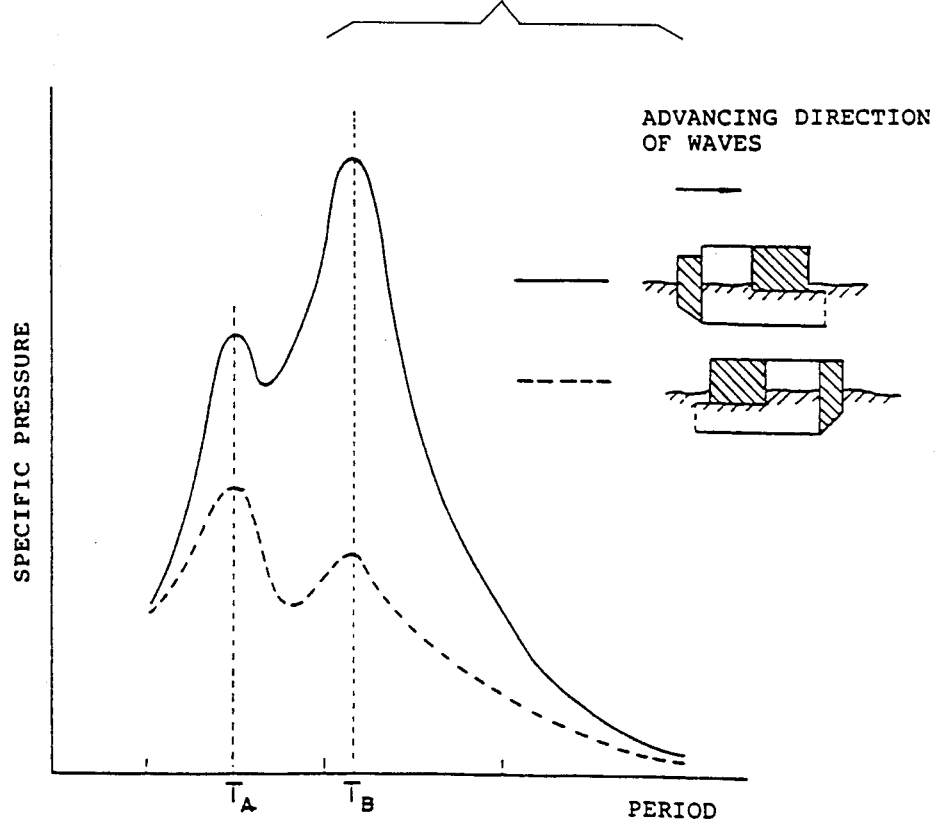

WAVE-ACTIVATED POWER GENERATOR

FIELD OF TECHNOLOGY

This invention relates to a wave-activated power generator, and particularly to a wave-activated power generator constructed in the form of a buoy thereby allowing to sufficiently utilize the wave power even in a shallow sea.

BACKGROUND TECHNOLOGY

Currently, the wave-activated power generator is practically used as a wave-activated power generating buoy of a nautical mark. An example of wave-activated power generating buoy is shown in FIG. 1. As shown, a wave-activated power generating buoy 1 includes a pipe 3 which is immersed vertically downward with respect to the water surface. The pipe 3 has a bottom end 4 opened downwardly and there is formed an air chamber 2 together with the water surface in the vicinity of a top end of the pipe. Above the air chamber 2 is provided a valve chamber 5, whose interior is divided into an upper chamber 5a and a lower chamber 5b, and an air turbine 6 and a power generator 7 driven by the air turbine 6 are provided inside of the upper chamber 5a. On the other hand, in the side walls of the upper chamber 5a and lower chamber 5b of the valve chamber 5 are provided an appropriate number of valves 8 to be capable of being open and closed. The upper chamber 5a is communicated to the lower chamber 5b via a through-hole 5c. Thus, as the water surface inside of the pipe 3 moves up and down due to wave motion, the air inside of the air chamber 2 flows into the atmosphere through the lower chamber 5b and the upper chamber 5a as indicated by the arrow in FIG. 1, whereby this air flow is utilized to rotate the air turbine 6 thereby driving the generator 7 to generate power.

FIG. 2 shows a performance curve of the wave-activated power generating buoy 1 shown in FIG. 1. In the graph of FIG. 2, the ordinate is taken for specific pressure (peak pressure in the air chamber/wave height) and the abscissa is taken for period (second). As is obvious from the graph of FIG. 2, this performance curve includes two peaks A and B. A smaller period $T_A$ for the peak A is a period of vertical vibration of buoy 1; whereas, a longer period $T_B$ for the peak B is a period of vibration of the water column inside of the central pipe 3 determined by the length 1 of central pipe 3 as $$T_B = 2\pi \sqrt{\frac{1}{g}}.$$

Actual generation of power by the buoy 1 is carried out by the waves between these two periods.

In order to implement practical wave-activated power generation, it is necessary to carry out power generation by the waves of broader range of period. And, for this purpose, it is necessary to make the period $T_B$ larger by making the length 1 of central pipe 3 longer. However, if the length 1 of the central pipe is made too long, it cannot be provided in a shallow sea and there are brought about problems in handling and maintenance since it becomes a lengthy structure. Accordingly, there has been a need to develop a wave-activated power generator capable of implementing wave-activated power generation for waves of a broader range of period without bringing about these various problems.

Therefore, the present invention has its object to provide a wave-activated power generator which has obviated the drawbacks of the prior art as described above.

Another object of the present invention is to provide a buoy-type wave-activated power generator capable of implementing wave-activated power generation at high efficiency even in a shallow sea.

A further object of the present invention is to provide a wave-activated power generator which is easy in handling and maintenance.

A still further object of the present invention is to provide a wave-activated power generator capable of implementing wave-activated power generation stably.

DISCLOSURE OF THE INVENTION

The present invention is characterized by providing a structure formed by bending a pipe connected to an air chamber approximately perpendicularly and capable of extending along the advancing direction of waves, thereby causing the water column inside the pipe to move in a reciprocating manner utilizing the wave motion near the water surface to produce high pressures inside the air chamber thereby driving to rotate an air turbine fluid dynamically connected to the air chamber to operate a generator to implement power generation. In particular, by constructing the wave-activated power generator of the present invention in the form of a ship-shaped buoy having its bow portion moored to a fixed point such as an anchor and an operating passage extending along the lengthwise direction of the ship-shaped buoy as bent horizontally from the air chamber with an open end of the operating passage located at the stern, it is possible to utilize the wave motion effectively and to implement wave-activated power generation stably.

BRIEF DESCRIPTION OF THE DRAWINGS

FIG. 8 is a graph for comparison of performance curves.

MOST PREFERRED FORM TO PRACTICE THE PRESENT INVENTION

To describe the present invention more in detail, modes of practice of the present invention will be described with reference to the attached drawings hereinbelow.

Figure 3:
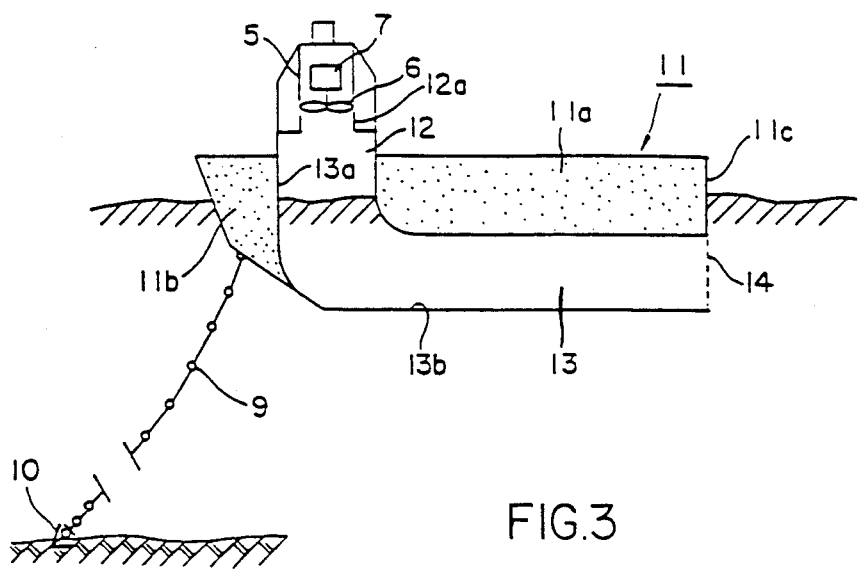
FIG. 3 is a schematic illustration showing a wave-activated power generating buoy constructed in accordance with one embodiment of the present invention.

FIG. 3 shows a wave-activated power generating buoy 11 having approximately a ship-type shape constructed in accordance with one embodiment of the present invention. The ship-shaped buoy 11 includes a main body 11a, which is floatable in the water surface, and its bow portion 11b is connected to an anchor 10 via a chain 9, so that the ship-shaped buoy 11 floats in the water surface along the advancing direction of waves. An air chamber 12 is provided in the vicinity of the bow 11b of main body 11a of the ship-shaped buoy 11, there is provided an operating passage 13 as communicated to the air chamber 12 at the bottom of the main body 11a. In the present embodiment, the operating passage 13 is generally in the shape of "L" and it includes a vertical passage portion 13a and a horizontal passage portion 13b extending horizontally from the bottom end of the vertical passage portion 13a toward the stern 11c with an air chamber 12 being defined in the vicinity of the top end of the vertical passage portion 13a. The horizontal passage portion 13b defines an open end 14 at the stern 11c of the buoy 11 and this open end 14 is submerged in the sea in the vicinity of the sea surface. On the other hand, there is provided a guide passage 12a extending upwardly from the air chamber 12; in the present embodiment, the guide passage 12a is communicated to the atmosphere through the valve chamber 5. Incidentally, inside the valve chamber 5 is provided the air turbine 6 and the generator 7.

Figure 4:
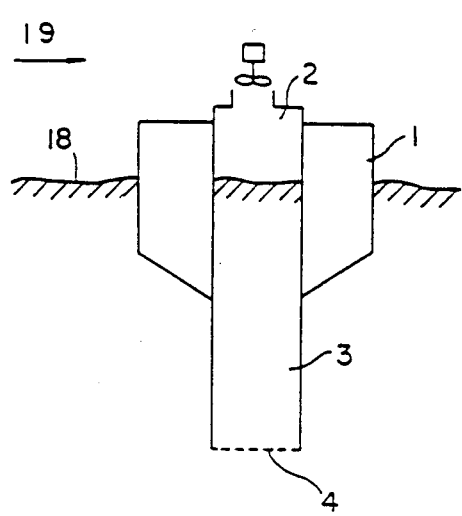
FIG. 4 is a schematic illustration which is useful for explaining the operation of the prior art wave-activated power generating buoy of FIG. 1.

Now, regarding the wave motion in the wave-activated power generating buoy 1 for use as a nautical mark shown in FIG. 1, a consideration will be given with reference to FIG. 4. As shown in FIG. 4, it is assumed that waves propagate in the direction indicated by the arrow 19 under the condition that the wave-activated power generating buoy 1 floats in the water surface 18. If the water surface 18 oscillates up and down at $(\frac{1}{2})H\sin\omega t$, the buoy 1 moves up and down with a slight delay. The displacement of the buoy in the vertical direction in this case is expressed by $(\frac{1}{2})H\sin(\omega t+\alpha)$. If the delay is relatively large, the vertical motion of the buoy may be approximated by $(\frac{1}{2})H\sin\omega t$.

Owing to such a vertical motion of the buoy 1, the water column inside the operating passage 3 formed by a pipe, duct, etc. tends to execute a relative motion of $-(\frac{1}{2})H \sin\omega t$ with respect to the buoy 1, thereby, in reality, producing a relative motion of $-(\frac{1}{2})(H-H')\sin\omega t$ depending upon the magnitude of wave amplitude H' at the open end 4 of the operating passage 3. Therefore, in the case where the open end 4 is deep in the sea where H' is close to the value of zero, the relative motion is approximately $-(\frac{1}{2})H\sin\omega t$; however, in the case of a shallow sea in which the open end 4 is located in the vicinity of the water surface, H'≈H, and, for this reason, the relative motion of the water column inside the operating passage 3 virtually disappears thereby producing no air output.

Figure 5:
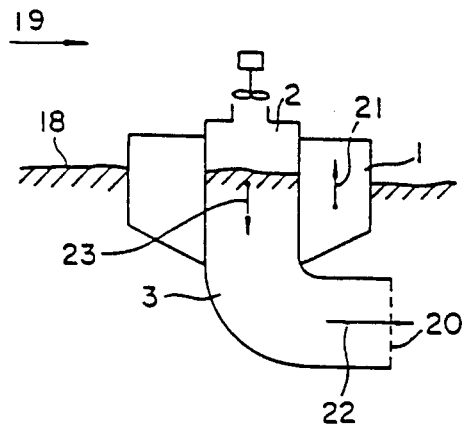
FIGS. 5 and 6 are each schematic illustrations which are useful for explaining the operation of the wave-activated power generating buoy of the present invention of FIG. 3.

On the other hand, as shown in FIG. 5, in the case where, on the basis of the principle of the present invention, the operating passage 3 is bent to provide the horizontal passage portion extending along the water surface with its open end 20 located at the downstream side, the horizontal motion due to waves of the sea in the vicinity of the open end 20 relatively adjacent to the water surface 18 is approximately expressed by $$\frac{\pi H}{T}$$

sinωt with the period of wave indicated by T. That is, when the buoy 1 moves upward as indicated by the arrow 21, the water column portion inside the operating passage 3 in the vicinity of the open end 20 tends to be pulled out toward the exterior as indicated by the arrow 22 in response to the wave motion indicated by the arrow 19. Accordingly, since the water column inside the bent passage 3 is positively discharged in response to the upward motion of the buoy 1, the water column portion inside the vertical passage of passage 3 positively moves in the direction indicated by the arrow 23. Thus, it is possible to obtain a high air output from the air chamber 2 by effectively utilizing the wave motion of water surface 18.

Figure 6:
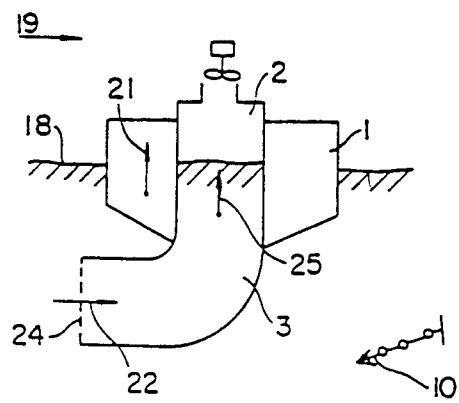

Incidentally, as shown in FIG. 6, in the case where the bent passage 3 is provided with its open end 24 directed opposite to the advancing direction of waves as indicated by the arrow 19, if the buoy 1 moves upward as indicated by the arrow 21, the water column portion in the vicinity of the open end 24 flows into the passage 3 due to wave motion as indicated by the arrow 22, so that the water column portion in the vertical passage portion of passage 3 rises as indicated by the arrow 25. In this case, the relative motion between the buoy 1 and the passage 3 tends to decrease so that the air output obtained from the air chamber 2 drops.

As is obvious from the above description, it is preferable to have the open end of the operating passage 3 oriented toward the downstream direction with respect to the advancing direction of waves. With such a structure, even if the open end of the operating passage 3 is not located deep in the sea, the water column inside the operating passage may be set in relative motion due to wave motion thereby allowing to obtain a high air output inside the air chamber. It is to be noted that the horizontal passage portion of the bent passage is not by all means necessary to be in parallel with the sea surface and it may also be provided inclined with respect to the sea surface. Besides, although it is preferable to have the oriented direction of the open end oriented toward the downstream direction 11 in alignment with the direction of wave motion, it may be oriented toward the downstream direction such that it does not receive the waves advancing due to wave motion. Furthermore, the location of the open end 20 from the water surface 18 may be set appropriately, for example, depending upon the length of operating passage 3.

Figure 1:
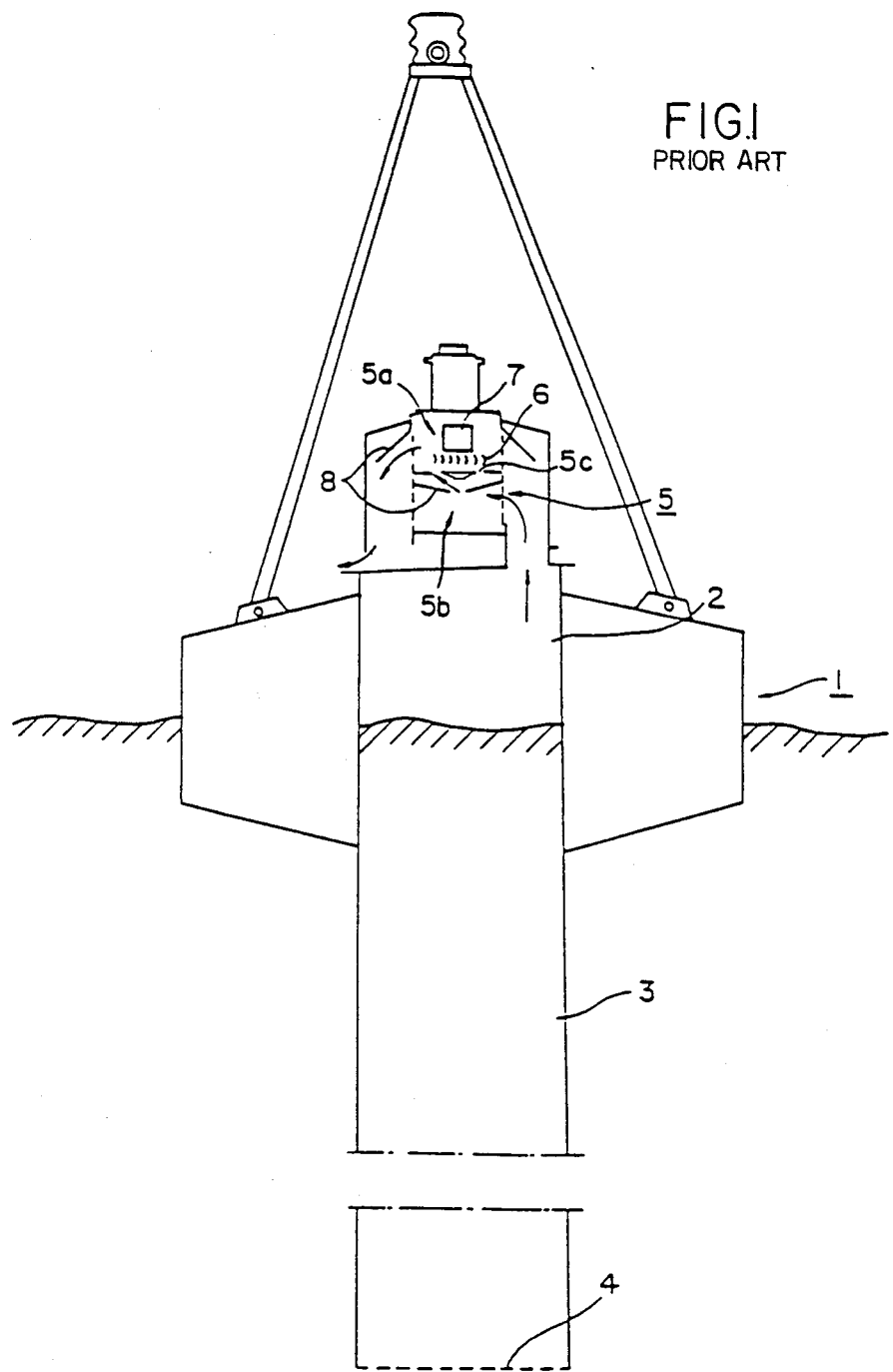
FIG. 1 is a schematic illustration showing an example of a prior art wave-activated power generating buoy.
Figure 2:
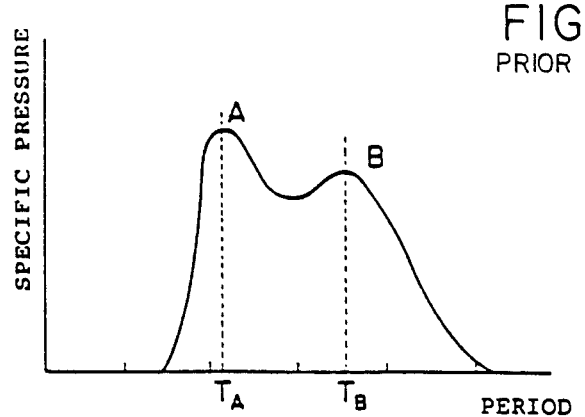
FIG. 2 is a graph showing the performance curve of the wave-activated power generating buoy of FIG. 1.

Similarly with the prior art device of FIG. 1, also in the ship-type wave-activated power generating buoy 11 provided with the operating passage bent toward the downstream direction formed as described above, there are two peaks in a usable wave period. That is, the shorter period $T_A$ is a period of vertical oscillation and this can be made sufficiently small in value because the buoy 11 can be designed to be shallow-bottomed in accordance with the present invention. On the other hand, the longer period $T_B$ is a period determined by $$2\pi \sqrt{\frac{l}{g}}$$

with l being the passage length from the air chamber 12 to the open end 14 at the stern through the passage 13 shown in FIG. 3, and, in accordance with the present invention, the period $T_B$ can be made sufficiently large in value. Thus, in accordance with the present invention, the period range $T_A$-$T_B$ of waves which are effectively usable for wave-activated power generation can be enlarged, thereby allowing to implement wave-activated power generation effectively. Besides, in the case where the wave-activated power generator of the present invention is constructed as a ship-type buoy, it is possible to form the operating passage 13 using approximately the entire length of the ship-type buoy 11 by disposing the air chamber 12 in the vicinity of the bow and the open end 14 at the stern. Moreover, when formed as a ship-type buoy, a drag against waves and water flow can be decreased and a stable operation can be carried out by shaping the bow portion excellent in water cutting and by making the buoy relatively shallow in draft.

Figure 7:
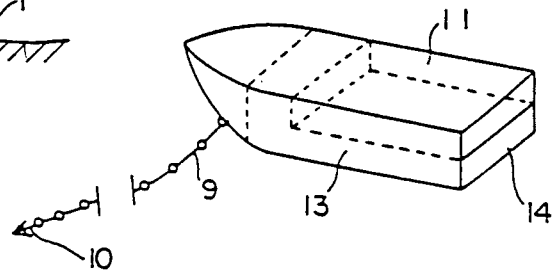
FIG. 7 is a perspective view showing an embodiment of the present invention constructed in the form of a ship-shaped buoy.

FIG. 7 is a perspective view showing an example of the wave-activated power generator of the present invention when constructed in the shape of a ship-type buoy, and there is shown the condition in which the open end 14 of the bent passage 13 is provided at the stern. It is also possible to provide the open end 14 in the ship bottom or the buoy; however, also in this case, it is necessary to exercize caution to have the open end 14 oriented toward the downstream direction. It goes without saying that the wave-activated power generator of the present invention may be constructed in an arbitrary shape other than a ship. Furthermore, use may be made of a means of various forms as a means for generating power by an air flow obtained as an output from the air chamber 12. For example, other than the impulse type turbine 6 driven to rotate by the air flow controlled to flow in one direction by the valve, as shown in the present embodiment, use may also be made of a vaneless type Wells turbine, Savonius turbine, etc., which is driven to rotate in one direction by receiving air flows of opposite direction.

FIG. 8 shows performance curves which are plots of the experimental results obtained from a small-scale model, in which the solid line is the case where the open end of the bent passage is oriented toward the downstream direction as shown in FIG. 5 and the dotted line is the case where the open end of the bent passage is oriented toward the upstream direction as shown in FIG. 6.

In accordance with the present invention, various effects can be obtained and some of the examples may be listed as in the following manner.

(1) A buoy can be formed shallow-bottomed and a sufficient power generation can be caused even in a shallow sea. This is the point to obviate the largest disadvantage of the prior art wave-activated power generating buoy for use as a nautical mark.

(2) It is possible to enhance the power generating efficiency by utilizing the wave motion in the water surface effectively.

(3) Since the peak to peak range in the period of wave motion which may be effectively used for wave-activated power generation increases, the wave motion-to-electricity conversion efficiency is enhanced.

(4) It is suitable to be constructed in the shape of a ship-type buoy and stabilization of power generating performance can be implemented.

INDUSTRIAL APPLICABILITY

As described in detail above, the wave-activated power generator of the present invention is useful as a resource-saving power generator, in particular as a power generator utilizing the wave power for use as a nautical mark; above all, it is useful as a wave-activated power generator for use in a shallow sea region.

I claim:

1. A wave-activated power generator comprising: an elongated main body having a first end and a second end opposite to said first end and floatable on a water surface; an air chamber formed in said main body at said first end thereof; power generating means in communication with one end of said air chamber and driven by an air flow flowing between said air chamber and atmosphere; a continuous open passage formed in said main body with one end of said passage in communication with an other end of said air chamber and the other end of said passage being submersible under the water surface and being formed as an open end at said second end of said main body in operation opened sideways, said continuous open passage including a vertical passage portion extending downward from said air chamber to a bottom end and a horizontal passage portion extending from the bottom end of said vertical passage portion to said open end, said continuous open passage open end arranged to receive a water column from a water wave, said water column being movable within said continuous open passage to obtain said air flow; and mooring means connected to said first end of said main body for mooring said main body in the water surface such that said open end is oriented toward the downstream direction with respect to the advancing direction of waves.

2. The wave-activated power generator as defined in claim 1 wherein said main body is formed in the shape of a ship having a bow and stern.

3. The wave-activated power generator as defined in claim 2 wherein said air chamber is disposed in the vicinity of the bow of said main body and said open end is disposed at the stern.

4. The wave-activated power generator as defined in claim 3 wherein said mooring means includes a chain having one end connected to the bow portion of said main body and another end connected to an anchor engageable with a sea bottom under said water surface.

* * * * *

UNITED STATES PATENT AND TRADEMARK OFFICE
CERTIFICATE OF CORRECTION

PATENT NO. : 4,858,434

DATED : August 22, 1989

INVENTOR(S) : Takahiko Masuda

It is certified that error appears in the above-identified patent and that said Letters Patent is hereby corrected as shown below:

On the front page of the Patent where it presently reads:
"[73] Assignee: Kohichi Nishikawa, Japan" it should read:
--[73] Assignee: Kohichi Nishikawa, Japan ( Part Interest)--

Signed and Sealed this

Thirty-first Day of July, 1990

Attest:

HARRY F. MANBECK, JR.

*Attesting Officer*  *Commissioner of Patents and Trademarks*